UNITED STATES PATENT OFFICE.

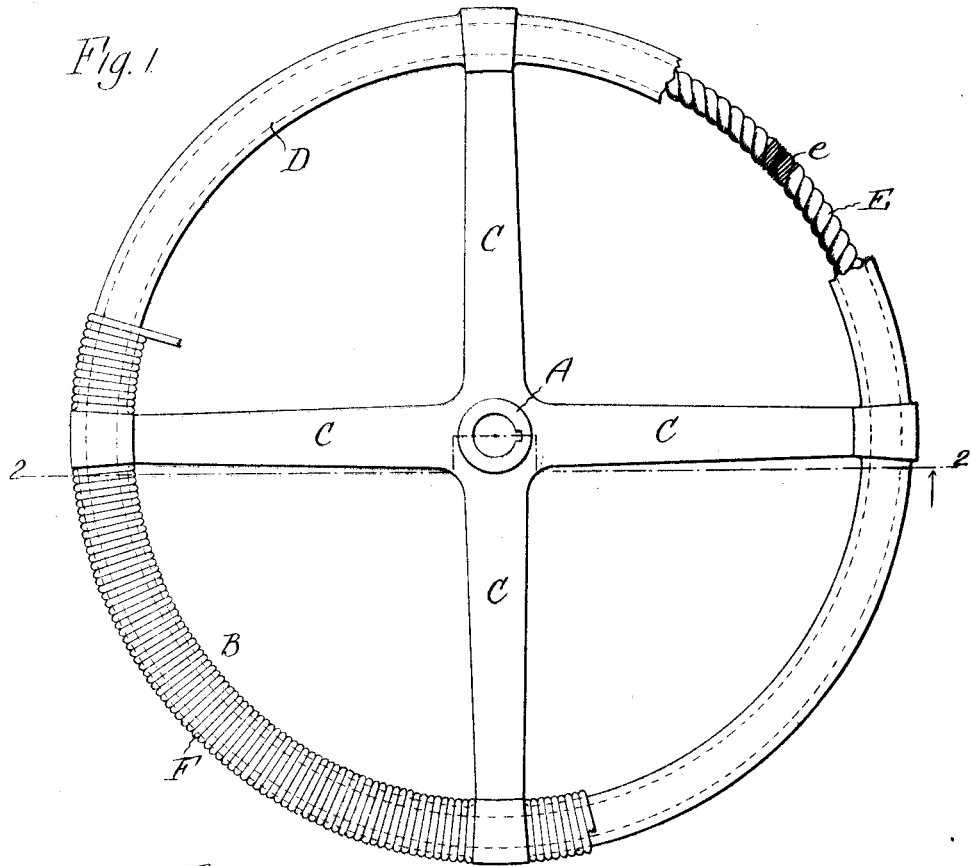
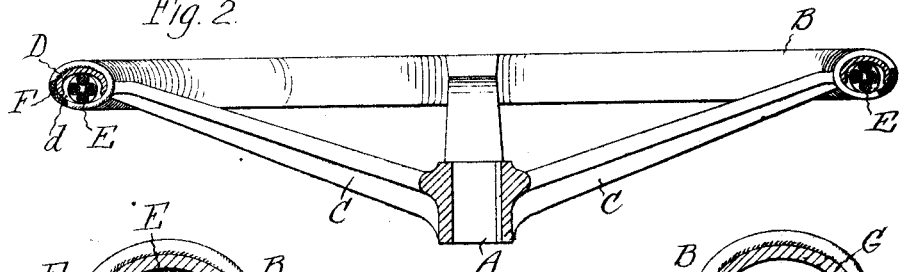
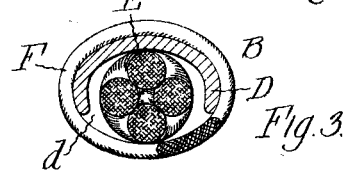
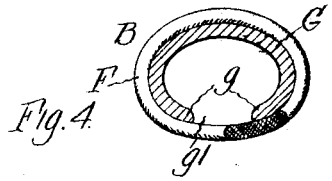

JOHN YOUNGER, OF BUFFALO, NEW YORK, ASSIGNOR TO THE PIERCE-ARROW MOTOR CAR COMPANY, OF BUFFALO, NEW YORK.

HAND OR STEERING WHEEL.

1,142,780.  Specification of Letters Patent.  Patented June 8, 1915.

Application filed February 8, 1915. Serial No. 6,723.

*To all whom it may concern:*

Be it known that I, JOHN YOUNGER, a citizen of Great Britain, residing at Buffalo, in the county of Erie and State of New York, have invented a new and useful Improvement in Hand or Steering Wheels, of which the following is a specification.

This invention relates to hand wheels or steering wheels, such as used for steering motor vehicles, and has for its object to produce a hand or steering wheel having a rim or handle portion of inexpensive but desirable and practical construction, which will be comfortable to the hands and enable the wheel to be grasped and held firmly without danger of slipping in the hands.

In the accompanying drawings: Figure 1 is a plan view of a steering wheel embodying the invention, portions thereof being broken away to show the construction. Fig. 2 is a sectional elevation thereof on line 2—2, Fig. 1. Fig. 3 is a cross-section, on a larger scale, of the rim of the wheel. Fig. 4 is a similar view of a modified construction.

The wheel comprises, as usual, a hub A, a circular rim B and spokes or arms C connecting the hub and rim. With the exception of the rim, the wheel can be of any suitable construction, and, as shown, the hub and arms or spokes consist of a malleable iron spider.

The rim B comprises a metal ring D which is of channel or substantially segmental elliptical shape in cross-section, open at its under side at $d$, and a rope core E which extends circumferentially of the rim in the channel thereof, and is retained in place by a wrapping of cord or the like F passing around the channel rim and the rope E. A piece of Manila or other rope, about three-fourths of an inch in diameter, laid in the channel rim with its ends abutting is suitable for the core E, and a cotton cord of about one-eighth of an inch in diameter is suitable for the wrapping. The abutting ends of the rope can be wound as indicated at $e$, or otherwise finished to prevent them from raveling, and the ends of the wrapping F between the arms or spokes C, the outer ends of which, as shown, encircle the channel ring D, can be tucked under the end turns of the wrapping or secured in any other way adapted to give a strong connection and neat finish. The whole rim is then dipped in shellac or otherwise treated to make it weatherproof.

As the wrapping F at the underside of the rim is backed only by the rope core E, which is exposed to the pressure of the hands through the open underside of the metal ring D, the under portion of the rim is not rigid but is capable of yielding or giving somewhat under pressure, and this, in connection with the roughened surface formed by the wrapping F, produces a comfortable grip for the hands and enables the same to be held firmly and securely in the hands.

In the construction shown in Fig. 4, the rope core is omitted and the lower edges $g$ of the metal rim G are extended nearer together, leaving a narrower opening $g'$ between the same so as to substantially maintain an elliptical cross sectional form of the wrapped rim. In this construction, as in the other, the wrapping F at the underside of the rim is adapted to yield somewhat under pressure.

I claim as my invention:

1. A hand wheel comprising a rigid channeled rim which is open circumferentially at one side, and a wrapping covering said channeled rim, said wrapping being adapted to yield under pressure between the edges of said channeled rim.

2. A hand wheel comprising a channeled rim which is open circumferentially at one side, a yielding core in said rim, and a wrapping covering said channeled rim and said core.

3. A hand wheel comprising a rigid channeled rim which is open circumferentially at one side, a rope core in said rim, and a cord wrapping covering said channeled rim and rope core.

4. A hand wheel comprising a hollow rim of substantially elliptical cross-section open circumferentially at its underside, a yielding core in said rim, and a covering wound around said hollow rim and core.

5. A hand wheel comprising a metal spider provided with a metal channeled rim open circumferentially at its underside, and a cord wrapping covering said rim and being adapted to yield between the edges thereof.

6. A hand wheel comprising a metal spider provided with a metal channeled rim open circumferentially at its underside, a rope extending circumferentially in said channeled rim, and a cord wrapping covering said rim and rope.

Witness my hand, this 30th day of January, 1915.

JOHN YOUNGER.

Witnesses:
GUSTAV W. HORA,
JOHN P. SEHL.